United States Patent
Jackson et al.

(10) Patent No.: US 7,189,459 B2
(45) Date of Patent: Mar. 13, 2007

(54) TURBINE BLADE FOR EXTREME TEMPERATURE CONDITIONS

(75) Inventors: Melvin Jackson, Niskayuna, NY (US); Pazhayannur Subramanian, Niskayuna, NY (US); Ji-Cheng Zhao, Latham, NY (US); Bernard Bewlay, Schenectady, NY (US); Ramgopal Darolia, West Chester, OH (US); Robert Schafrik, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 437 days.

(21) Appl. No.: 10/334,590

(22) Filed: Dec. 31, 2002

(65) Prior Publication Data

US 2004/0126237 A1 Jul. 1, 2004

(51) Int. Cl.
*B32B 13/06* (2006.01)
*B32B 9/04* (2006.01)

(52) U.S. Cl. .................. 428/446; 428/450; 416/241 B; 416/241 R

(58) Field of Classification Search ................ 428/446, 428/448, 632, 633, 670, 679, 680, 131, 450, 428/469; 416/241 R, 241 B, 97 R
See application file for complete search history.

(56) References Cited

U.S. PATENT DOCUMENTS

| | | | | |
|---|---|---|---|---|
| 4,820,126 A | * | 4/1989 | Gavilan | ....................... 416/221 |
| 5,626,462 A | * | 5/1997 | Jackson et al. | ........... 416/97 R |
| 6,158,963 A | * | 12/2000 | Hollis et al. | ............. 416/219 R |
| 6,428,910 B1 | * | 8/2002 | Jackson et al. | ............. 428/660 |
| 6,471,479 B2 | | 10/2002 | Starkweather | |
| 6,485,262 B1 | | 11/2002 | Heyward et al. | |
| 6,485,792 B1 | | 11/2002 | Grylls et al. | |
| 6,485,845 B1 | | 11/2002 | Wustman et al. | |
| 6,521,356 B2 | * | 2/2003 | Zhao et al. | .................. 428/632 |
| 6,726,444 B2 | * | 4/2004 | Zhao et al. | .................. 415/115 |
| 2002/0192491 A1 | | 12/2002 | Zhao et al. | |
| 2005/0079377 A1 | * | 4/2005 | Bewlay et al. | .............. 428/663 |

* cited by examiner

*Primary Examiner*—Jennifer McNeil
*Assistant Examiner*—Elizabeth Ivey
(74) *Attorney, Agent, or Firm*—Paul J. DiConza; William E. Powell, III

(57) ABSTRACT

One exemplary embodiment of a turbine component (which may be a blade) comprises a substrate comprising a silicide-based material, a plurality of through holes disposed in the substrate, the holes being configured to receive an airflow, a silicide coating disposed at the surfaces of the substrate and the through holes, and a thermal barrier coating disposed at the silicide coating. In another exemplary embodiment the silicide coating may be replaced by a Laves phase-containing layer. In still another exemplary embodiment the silicide coating may be replaced by a diffusion barrier layer disposed at a surface of the substrate and a platinum group metal layer disposed at the diffusion barrier layer. One exemplary embodiment of a blade may comprise an airfoil comprising a silicide-based material and through holes disposed therein, a cooling plenum disposed in the airfoil, and a base configured to receive the airfoil in a dovetail fit, the base comprising a superalloy.

22 Claims, 5 Drawing Sheets

TURBINE BLADE FOR EXTREME TEMPERATURE CONDITIONS

TECHNICAL FIELD

This disclosure relates generally to turbine blades and, more particularly, to a turbine blade for use in extreme temperature conditions, the blade having a light weight silicide-based airfoil disposed at a superalloy base. Further, the airfoil may have transpirational cooling holes.

BACKGROUND

Turbines are devices that generate rotary mechanical power from the energy in a stream of moving fluid. Applications in which turbines may be incorporated include aircraft, watercraft (both marine- and fresh water-based systems), various types of land-craft, and the like. Materials from which turbine components may be fabricated typically include those from a class of materials known as superalloys, which characteristically exhibit desirable chemical and physical properties under the service conditions generally experienced during turbine operation. Superalloys in which the base constituent is an alloy of nickel (Ni), iron (Fe), or cobalt (Co) are of particular interest in such applications because of their ability to withstand the normally high operating temperatures of the turbine service environment. Temperature constraints of such superalloys, particularly with respect to single-crystal nickel-based superalloys, however, limit the use of such superalloys in turbine engines in which extreme temperature conditions may be experienced.

At such extreme temperatures, the superalloys that are used to form the turbine components are highly susceptible to damage from such mechanisms as creep, oxidation, and melting. The application of thermal barrier coatings (TBCs), which are typically formed of a refractory material, to the component surfaces enhances the performance of superalloys at extreme temperature by reducing the temperature at the metal surface. Although such coatings offer some degree of protection, they are subject to undesirable qualities such as chipping, cracking, and spalling.

The problems associated with resistance to oxidation in the turbine service environments as well as the melting points of the construction materials are often exacerbated by state-of-the-art turbine designs, which call for increasingly higher operating temperatures in order to boost turbine efficiency. In advanced design concepts, the surface temperatures of components are expected to exceed the melting points of state-of-the-art superalloys. What is needed, therefore, are turbine components having improved extreme temperature capabilities relating to such parameters as, for example, elevated melting point and oxidation resistance. In particular, new airfoil materials and structures are needed to surpass the existing state-of-the-art superalloys and structures to attain higher engine efficiencies. Due to the high costs associated with materials exhibiting sufficient extreme temperature capabilities, an additional need is cost effectiveness of the component.

BRIEF DESCRIPTION OF THE INVENTION

Disclosed herein are turbine components for use in extreme temperature conditions. One exemplary embodiment of a turbine component comprises a substrate comprising a silicide-based material, a plurality of through holes disposed in the substrate, the holes being configured to receive an airflow, a silicide coating disposed at the surfaces of the substrate and the through holes, and a thermal barrier coating disposed at the silicide coating. Another exemplary embodiment of a turbine component comprises a substrate comprising a silicide-based material, a plurality of through holes disposed in the substrate, the through holes being configured to receive an airflow, a Laves phase-containing layer disposed at surfaces of the substrate and the through holes, and a thermal barrier coating disposed at the Laves phase-containing layer. Still another exemplary embodiment of a turbine component comprises a substrate comprising a silicide-based material, a plurality of through holes disposed in the substrate, the holes being configured to receive an airflow, a diffusion barrier layer disposed at a surface of the substrate, a platinum group metal layer disposed at the diffusion barrier layer, and a thermal barrier coating disposed at the platinum group metal layer.

One exemplary embodiment of a turbine blade comprises an airfoil comprising a silicide-based material and through holes disposed in the silicide-based material, a base at which the airfoil is received, a silicide-based coating disposed at an exposed surface of the airfoil, and a thermal barrier coating disposed at an exposed surface of the silicide-based coating. Another exemplary embodiment of a turbine blade comprises an airfoil comprising a silicide-based material and through holes disposed in the silicide-based material, a base at which the airfoil is received, a Laves phase-containing layer disposed at surfaces of the airfoil, the through holes, and the base, and a thermal barrier coating disposed at an exposed surfaces of the Laves phase-containing layer. Still another exemplary embodiment of a turbine blade comprises an airfoil comprising a silicide-based material and through holes disposed in the silicide-based material, a base at which the airfoil is received, a diffusion barrier layer disposed at a surface of the airfoil, a platinum group metal layer disposed at the diffusion barrier layer, and a thermal barrier coating disposed at the platinum group metal layer. A turbine blade may still further comprise an airfoil comprising a silicide-based material and through holes disposed in the silicide-based material, a cooling plenum disposed in the airfoil, and a base configured to receive the airfoil in a dovetail fit, the base comprising a superalloy.

BRIEF DESCRIPTION OF THE DRAWINGS

Referring now to the Figures, in which like elements are represented by like numerals.

DETAILED DESCRIPTION

Disclosed herein is a hybrid turbine component. The component is preferably configured to be incorporated into a turbine system that may be used for any one of or a variety of applications (e.g., aircraft, watercraft, as well as land-based applications). During normal operation of such a turbine system, the turbine components are generally subject to high temperatures of about 1,150 degrees Centigrade (degrees C.). Such components include, but are not limited to, blades, combustors, stators, vanes, shrouds, and the like. The surfaces of the components are preferably formed from silicide-based materials (e.g., niobium-silicides, niobium-based refractory intermetallic composite materials, or molybdenum-based-silicide-containing composites (e.g., molybdenum-silicon-boride)). Silicide-based coatings disposed over the components provide oxidation resistance and enable the adherence of various other coatings at the extreme operating temperatures (those temperatures exceeding about 1,150 degrees C.) of the turbine. Other components of the system may be fabricated from superalloy materials (e.g., nickel-based superalloys, cobalt-based superalloys, iron-based superalloys, or combinations thereof.

Figure 1:
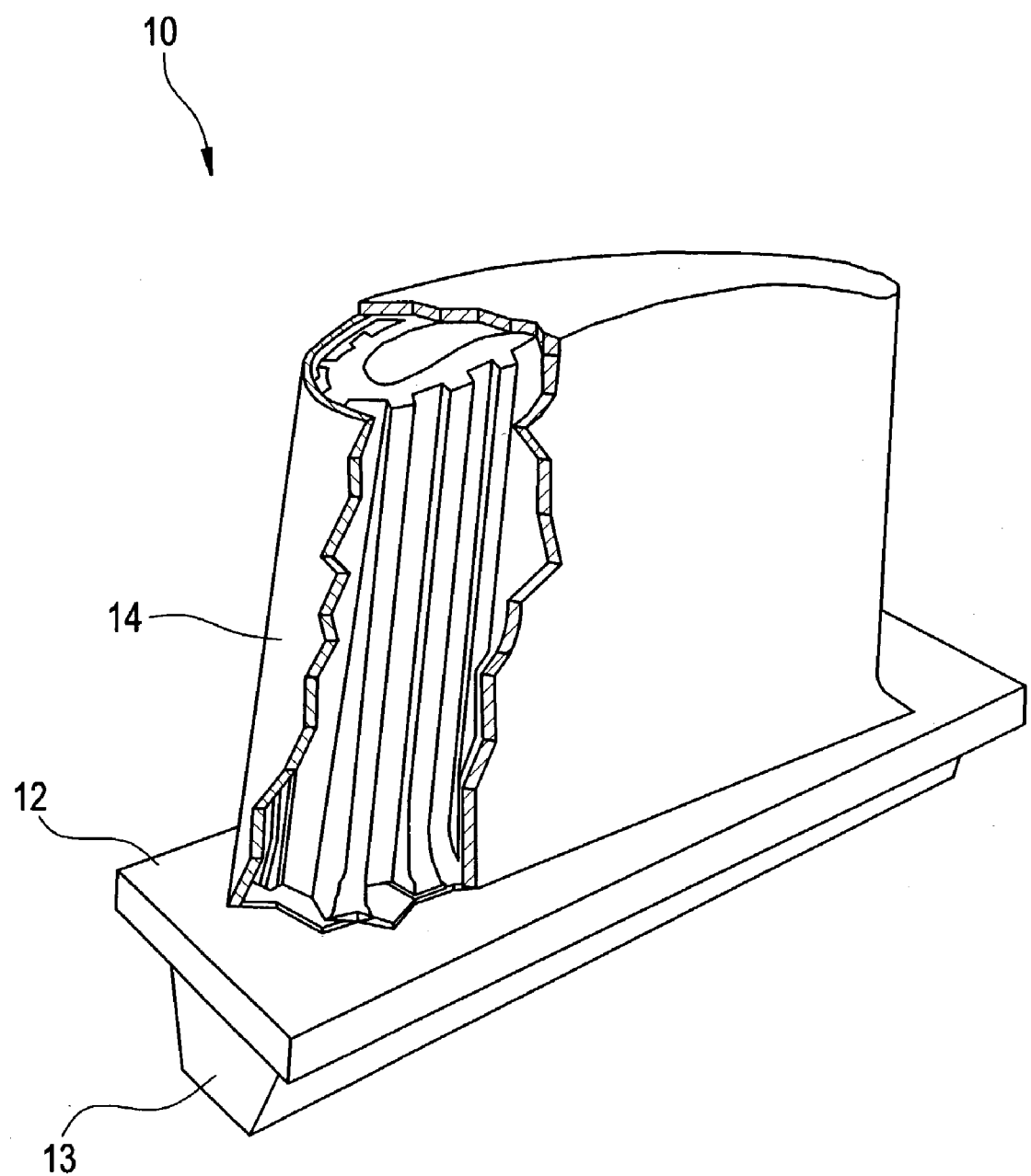
FIG. 1 is a perspective cutaway view of a turbine blade.

Referring now to FIG. 1, one exemplary embodiment of a turbine component configured for operation in the extreme temperature gas stream of a turbine is a blade 10. Blade 10 comprises a base 12 and an airfoil 14. Airfoil 14 extends from base 12. A root 13 of base 12 is mountable to a perimeter surface of a rotor disk (not shown) that rotates about a centerline of an engine (not shown). An assembly of a plurality of bases 12 and their associated airfoils 14 disposed in a rotor disk comprises a turbine rotor (not shown).

Figure 2:
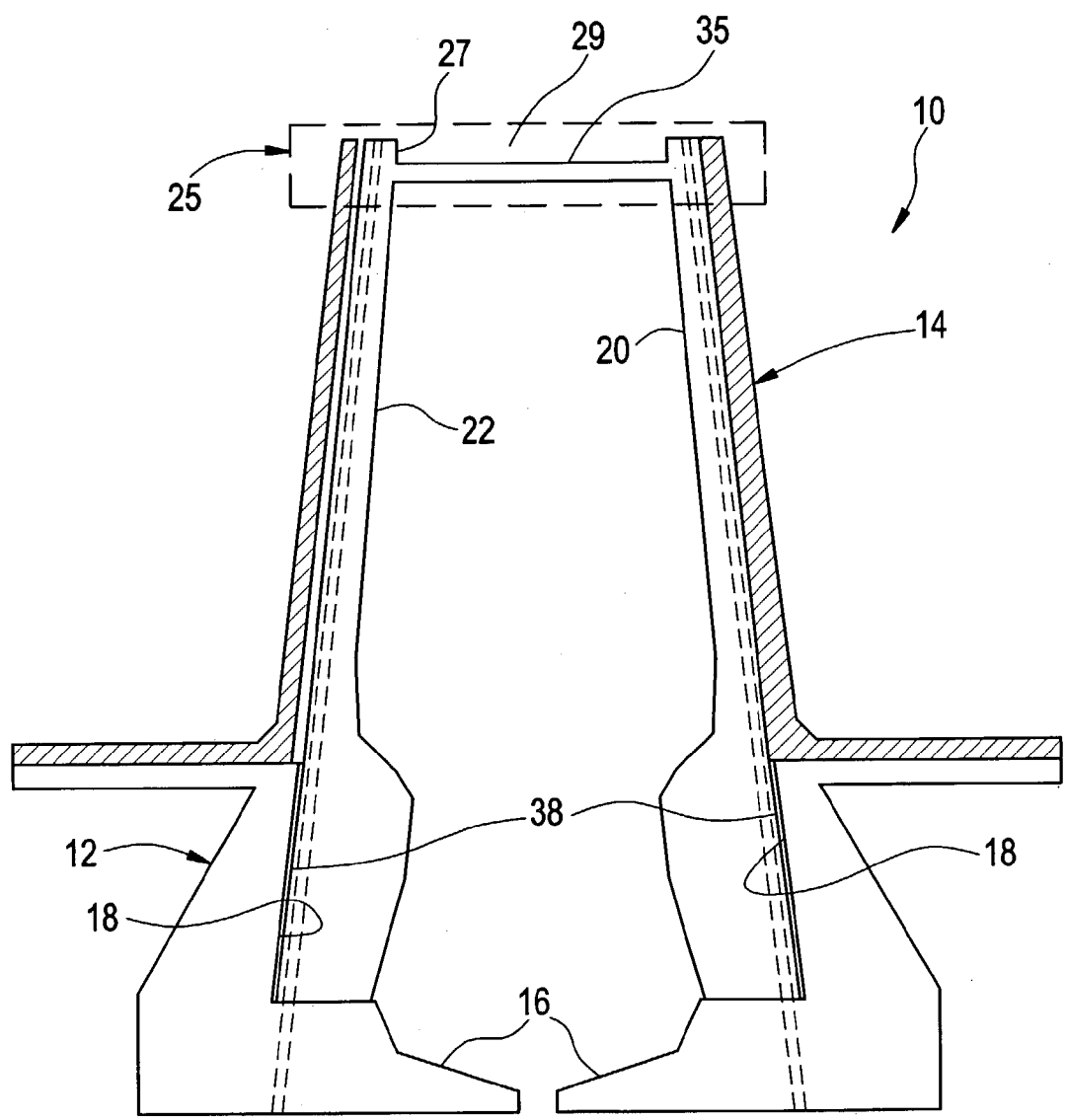
FIG. 2 is a cross-sectional representation of the turbine blade of FIG. 1.
Figure 3:
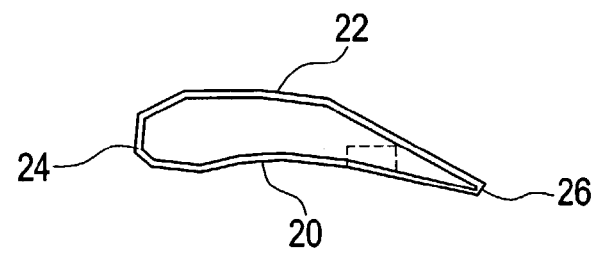
FIG. 3 is a plan view of the turbine blade of FIG. 1.

Referring now to FIG. 2, airfoil 14 of blade 10 comprises a hollow structure defined by a first wall 20 and a second wall 22 that are preferably integrally joined together by a plurality of internal transverse ribs extending between walls 20, 22. The structure is produced by any suitable method such as, for example, investment casting, directional solidification, extrusion, powder metallurgical methods, or the like. Referring to both FIGS. 2 and 3, walls 20, 22 are spaced circumferentially or laterally apart from each other between a leading edge 24 and an axially-spaced trailing edge 26 and are joined together at edges 24, 26 to define a concave pressure region at wall 20 and a convex suction region at wall 22. The end of airfoil 14 distal from base 12 preferably includes a squealer tip 25, as is shown in FIG. 2, which comprises an outward extension from walls 20, 22 to define a squealer wall 27 peripherally disposed around a cavity 29 and a squealer tip base 35. Base 12 comprises opposingly-positioned first- and second halves 16, each half 16 including facing surfaces 18 at which the lower portions of walls 20, 22 of airfoil 14 is received in an interference fit. Base 12 is preferably fabricated from a superalloy material as described above.

Referring specifically to FIG. 2, airfoil 14 is received into base 12 in a dovetail arrangement and is retained therein in an interference fit. In particular, airfoil 14 is captured between halves 16, which are then preferably metallurgically joined. Such a configuration allows the load exerted on airfoil 14 during operation of the rotor to be transferred across the interference fit and distributed over the length of the blade, thereby reducing the amount of stress experienced at the juncture of base 12 and airfoil 14. Airfoil 14 may be thicker or appropriately dimensioned proximate base 12 to provide for increased load carrying ability. The expansion difference between the (greater expanding) base 12 and airfoil 14 may be about 0.6% to about 0.7% from room temperature to temperatures characteristic of the metallurgical joining process and will establish compressive loads on airfoil 14 at service temperatures of about 700 to about 850 degrees C. proximate base 12. The metallurgical joining process may comprise braze joining or SWET welding (superalloy welding at high temperature), both of which may result in temperatures of about 1,200 degrees C.

The mating surfaces of airfoil 14 and base 12 are maintained in communication through a reaction barrier coating 38, which preferably comprises alumina, yttria-stabilized zirconia (YSZ), mullite, MCrAlY (wherein M is at least one of nickel, iron, and cobalt), platinum-nickel aluminide ((NiPt)Al), nickel aluminide (NiAl), ruthenium, tungsten, rhenium, alloys comprising ruthenium, tungsten, or rhenium, or a combination of any one of the foregoing materials. Because the airfoil mating surface is the surface that is easier to process than the base mating surface, reaction barrier coating 38 is typically deposited onto the airfoil mating surface by various techniques such as physical vapor deposition, thermal spray deposition, and the like. Reaction barrier coating 38 prevents or inhibits chemical interaction between the material from which base 12 is fabricated and the materials from which airfoil 14 is fabricated.

Figure 4:
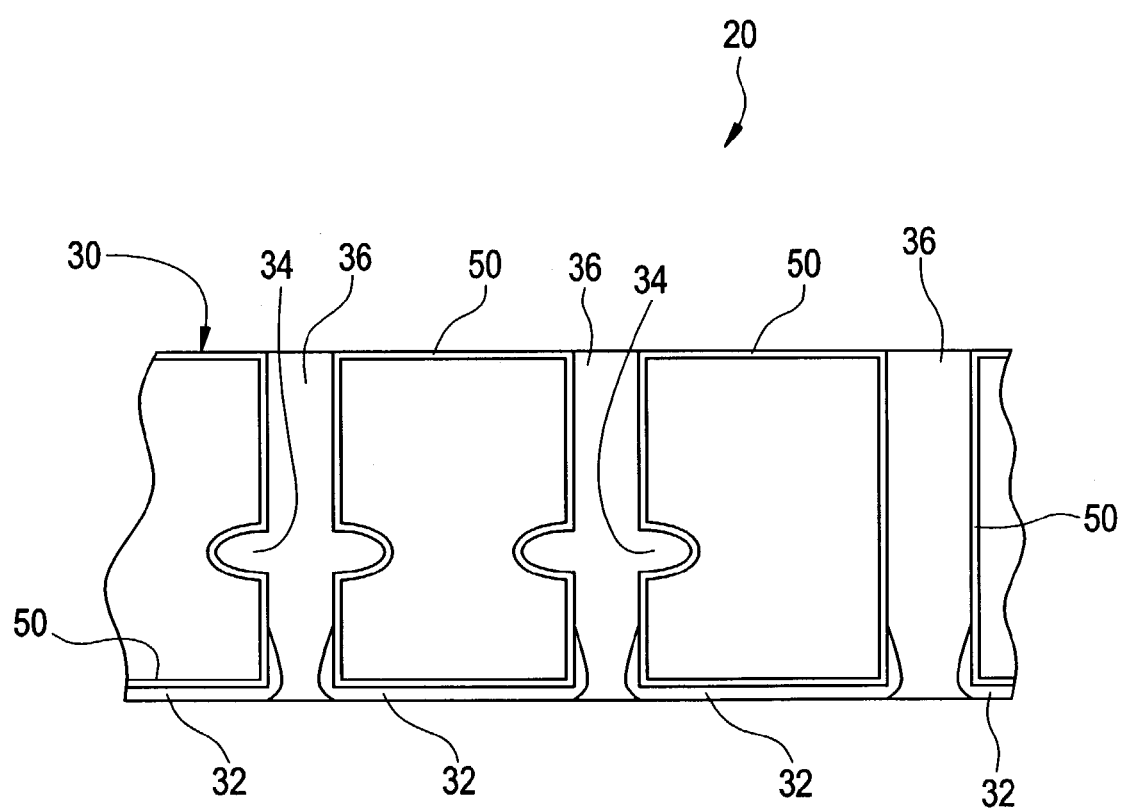
FIG. 4 is a cross-sectional representation of an airfoil wall.

Referring now to FIG. 4, each wall 20, 22 of airfoil 14 comprises a substrate 30. Although only wall 20 is shown, it should be understood that wall 22 is preferably of a similar construction. Substrate 30 includes a plurality of cooling plenums 34 defined within the thickness of substrate 30. Cooling plenums 34, which are preferably slots that extend lengthwise throughout the thickness of substrate 30, reduce the airfoil mass, allow for fluid communication between the interior of the airfoil and the environment adjacent to the airfoil, and facilitate the cooling of the airfoil during its operation. These cooling plenums 34 are preferably disposed within substrate 30 via sacrificial cores during investment casting or hot isostatic press consolidation of powders, the cores being removed by methods such as chemical leaching. These cooling plenums 34 may also preferably be disposed within substrate 30 via a wire electro-discharge machining (EDM) process. If cooling plenums 34 are disposed within walls 20, 22 by the EDM process from the corresponding external surfaces, the trace of the wire may be back-filled with an appropriate material, e.g., niobium-titanium or any powder having a chemistry similar to the airfoil itself.

Transpiration cooling holes 36 are disposed within substrate 30 to provide fluid and thermal communication between cooling plenums 34 and the environment adjacent to and exterior to wall 20. Transpiration cooling holes 36 preferably extend through substrate 30 and are dimensioned such that upon disposing coatings over substrate 30, sufficient airflow is directed through the walls to allow for transpirational cooling of the airfoil to meet pre-selected service requirements of the airfoil. For example, in an airfoil in which the walls are about one half to 3 millimeters (mm) thick, preferably about 2 mm thick, transpiration cooling holes 36 having diameters of about 150 to about 350 micrometers and preferably about 250 micrometers may be formed.

In one exemplary embodiment in which substrate 30 comprises niobium silicide, an oxidation resistant coating 50 is preferably disposed at the surface of substrate 30 to provide protection against extreme temperatures and oxidation. Oxidation resistant coating 50 is preferably disposed at all interior and exterior surfaces of the airfoil, as well as within transpiration cooling holes 36. This coating 50 can be crystalline, having a volume fraction of crystalline phase greater than or equal to about 60 volume percent, preferably greater than or equal to about 80 volume percent, and more preferably greater than or equal to about 95 volume percent. Oxidation resistant coating 50 is preferably disposed at a thickness of about 10 micrometers to about 200 micrometers. Preferably, the thickness of coating 50 is about 15 micrometers to about 175 micrometers, more preferably about 20 micrometers to about 150 micrometers, and even more preferably about 25 micrometers to about 125 micrometers. Processes by which coating 50 can be deposited include, but are not limited to, slurry reaction, thermal spray deposition, ion plasma deposition or physical vapor deposition. A thermal barrier coating 32 can be disposed over oxidation resistant coating 50.

Figure 5:
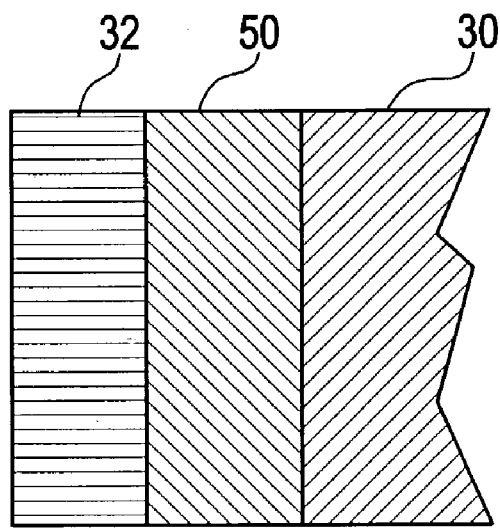
FIGS. 5 and 8 are cross-sectional representations of an oxidation resistant coating and a thermal barrier coating disposed on an airfoil wall.
Figure 6:
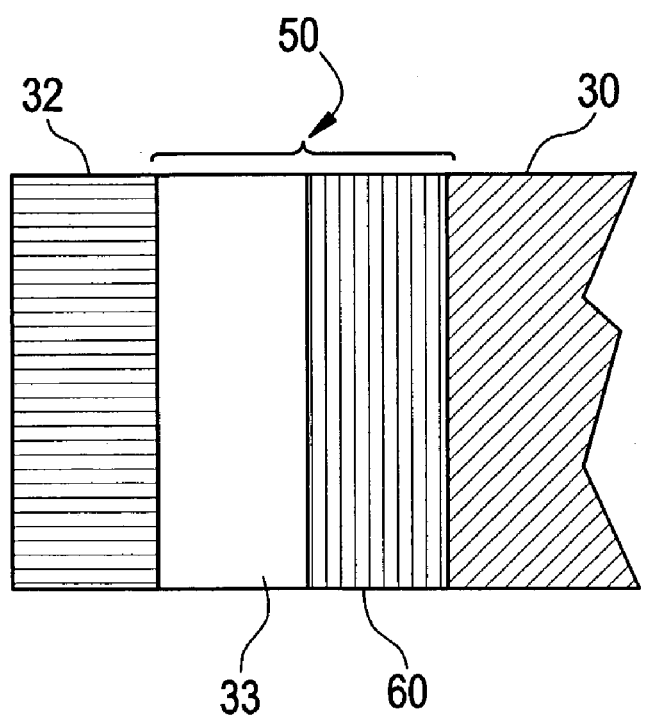
FIG. 6 is a cross-sectional representation of a multiple-layer oxidation resistant coating and a thermal barrier coating disposed on an airfoil wall.
Figure 7:
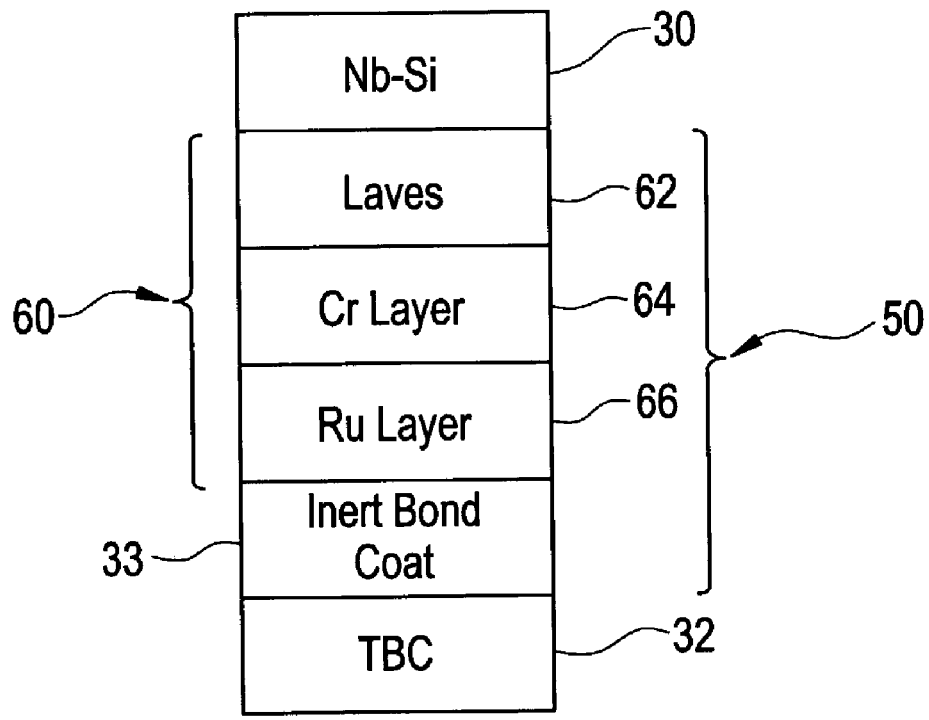
FIG. 7 is a cross-sectional representation of the coatings of FIG. 6 showing the multiple-layers of the oxidation resistant coating.

Referring now to FIGS. 5–7, oxidation resistant coating 50 and its relation to the adjacently-positioned substrate 30 and TBC 32 is shown. In one exemplary embodiment of oxidation resistant coating 50, as is shown in FIG. 5, coating 50 comprises a silicide comprising about 43 to about 67 atomic percent silicon, about 2 to about 25 atomic percent titanium, about 1 to about 25 atomic percent chromium, and a balance of niobium. Coating 50 may further comprise at least one metal selected from the group consisting of boron, iron, and tin, wherein the total amount of these elements comprises less than about 5 atomic percent of the coating. Additionally, coating 50 may comprise up to about 20 atomic percent germanium, where germanium replaces silicon. Coating 50 may also include up to about 3 atomic percent of at least one element selected from the group consisting of hafnium, tantalum, aluminum, tungsten, and molybdenum. Exemplary embodiments of coating 50 include, but are not limited to, $NbSi_2$, $Nb_5Si_3$, $TiSi_2$, $Ti_5Si_4$, $Ti_5Si_3$, $CrSi_2$, $CrSi$, $Cr_5Si_3$, $(Cr, Nb, Ti)_6Si_5$, $(Cr, Nb)_{11}Si_8$ or a combination comprising at least one of the foregoing materials.

Preferably, coating 50 comprises about 50 to about 67 atomic percent silicon, about 8 to about 16 atomic percent titanium, about 4 to about 12 atomic percent chromium, and a balance of niobium. Most preferably, coating 50 comprises about 66 atomic percent silicon, about 10 atomic percent titanium, about 5 atomic percent chromium, and a balance of niobium.

In another exemplary embodiment, oxidation resistant coating 50 may comprise multiple layers, as is shown in FIGS. 6 and 7. Such a multiple layer construction preferably comprises a diffusion barrier layer 60 and an inert bond coat layer 33. Diffusion barrier layer 60 defines a barrier that isolates inert bond coat layer 33 from the surface of substrate 30 and sustains a greater driving force toward the interdiffusion of the silicide material and TBC 32. Diffusion barrier layer 60 comprises a Laves phase-containing layer 62, a chromium layer 64, and a ruthenium layer 66. Laves phase-containing layer 62 preferably comprises C14 Laves of the form $(Nb, Ti)(Cr, Si, Al)_2$, with about 30 to about 37 atomic percent niobium or combinations comprising niobium and titanium, and about 63 to about 70 atomic percent of (Cr, Si, Al), where the specific ranges are about 28 to about 60 atomic percent chromium, up to about 35 atomic percent silicon, and up to about 42 atomic percent aluminum. Either aluminum or silicon is generally present in the Laves phase. Because the Laves phase-containing layer 62 is in equilibrium with chromium, chromium layer 64 is preferably disposed adjacent to the Laves phase-containing layer 62. However, because the diffusivity of chromium in a precious metal may be rapid, chromium layer 64 is preferably isolated from the inert bond coat layer 33 (which contains a precious metal) by the intervening ruthenium layer 66. By disposing ruthenium layer 66 at chromium layer 64, interaction distances between the chromium and inert bond coat layer 33 are increased.

As stated above, inert bond coat layer 33 comprises a precious metal. More specifically, inert bond coat layer 33 comprises a platinum group metal (e.g., platinum, palladium, rhodium, and the like, or combinations thereof). The platinum group metals exhibit suitable thermal expansion behavior and provide thermal protection to the underlying layers and the airfoil surface. Because the thermal expansion behavior of the materials of inert bond coat layer 33 are matched to TBC 32, TBC 32 may be disposed at inert bond coat layer 33 to substantial thicknesses.

Figure 8:
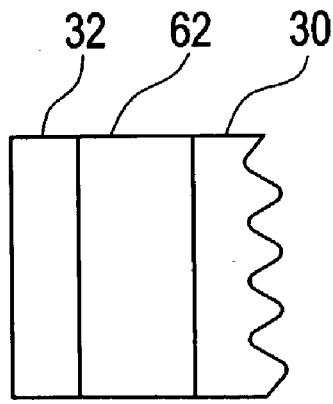

Disposed over inert bond coat layer 33 is TBC 32. Thermal barrier coating 32 preferably comprises YSZ, which is comparable to the thermal expansion behavior of niobium silicide when the expansion behavior is a function of temperature. Thermal barrier coating 32 is typically deposited onto oxidation resistant coating 50 (at substrate 30) by an electron beam physical vapor deposition (EB-PVD) technique or a thermal spray process to a thickness of about 100 micrometers to about 400 micrometers, and preferably to a thickness of about 250 micrometers. Upon coating the walls of the airfoil structure with TBC 32, the transpiration cooling holes are reduced to about 150 micrometers in diameter. In still another exemplary embodiment as is shown in FIG. 8, oxidation resistant coating 50 may comprise Laves phase-containing layer 62 without the attendant chromium, ruthenium, or inert bondcoat layers.

The above-described embodiment of an airfoil for a turbine blade has a number of advantages over other airfoils. For example, the airfoil blade can comprise an alloy having lower strength and higher oxidation/wear resistance. Additionally, the dovetail-configured base can comprise an alloy having improved low-temperature strength and high damage tolerance, thereby providing for an enhanced distribution of stresses at the airfoil surface during service.

The oxidation resistant coatings protect the turbine components derived from niobium-based silicides or molybdenum-based silicides from undergoing oxidation at higher temperatures of about 1,090 degrees C. to about 1,370 degrees C. In addition, the coatings protect the turbine components from undergoing pesting at lower temperatures of about 760 degrees C. to about 980 degrees C. The oxidation resistant coatings are further advantageous inasmuch as good adhesion to the thermal barrier coatings is effected, which provides an additional layer of protection to the turbine components.

The hybrid airfoil described above also embodies a number of advantages over other airfoils. The silicides (particularly the niobium-silicides) have higher melting points than the nickel-based superalloys, and the oxidation resistant coatings provide excellent oxidation resistance to the substrate surfaces while facilitating the improved adherence of the thermal barrier coating to the environmentally resistant coatings. Furthermore, the airfoil-dovetail design creates cooling features, reduces the weight, and makes the complex airfoil easy to manufacture. Moreover, the transpirational cooling can further enhance engine efficiency by improving the cooling efficiency. The TBC adherence together with the outstanding coating oxidation resistance, high melting temperature and improved high temperature strength make such airfoils suitable for higher temperature operations of about 1,090 degrees C. to about 1,370 degrees C. The hybrid airfoil takes advantage of the excellent high temperature properties of oxidation resistant coatings and the niobium-based silicides in reducing the airfoil density, while allowing attachment to a turbine disk made with nickel-based superalloys.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A turbine component, comprising:
   a substrate comprising a silicide-based material;
   a plurality of through holes disposed in said substrate, said holes being configured to receive an airflow;
   a Laves phase-containing layer disposed at surfaces of said substrate and said through holes, wherein said Laves phase-containing layer is of the form (Nb, Ti)(Cr, Si, Al)$_2$ and is about 30 to about 37 atomic percent niobium or a combination comprising at least one of niobium and titanium and about 63 to about 70 atomic percent chromium, silicon, aluminum, or any combination comprising at least one of chromium, silicon, and aluminum; and
   a thermal barrier coating disposed at said Laves phase-containing layer.

2. The turbine component of claim 1, wherein said silicide-based material is niobium silicide, a niobium-based refractory intermetallic composite, a molybdenum-based silicide, or a combination of the foregoing materials.

3. A turbine component, comprising:
   a substrate comprising a silicide-based material;
   a plurality of through holes disposed in said substrate, said holes being configured to receive an airflow;
   a diffusion barrier layer disposed at a surface of said substrate;
   a platinum group metal layer disposed at said diffusion barrier layer; and
   a thermal barrier coating disposed at said platinum group metal layer.

4. The turbine component of claim 3, wherein said silicide-based material is niobium silicide, a niobium-based refractory intermetallic composite, a molybdenum-based silicide, or a combination of the foregoing materials.

5. The turbine component of claim 3, wherein said diffusion barrier layer comprises,
   a Laves phase-containing layer,
   a chromium layer, and
   a ruthenium layer.

6. The turbine component of claim 5, wherein said Laves phase-containing layer is of the form (Nb, Ti)(Cr, Si, Al)$_2$ and is about 30 to about 37 atomic percent niobium or a combination comprising at least one of niobium and titanium and about 63 to about 70 atomic percent chromium, silicon, aluminum, or any combination comprising at least one of chromium, silicon, and aluminum.

7. The turbine component of claim 3, wherein said platinum group metal layer is platinum, palladium, rhodium, or a combination comprising at least one of the foregoing metals.

8. A turbine blade, comprising:
   an airfoil comprising a silicide-based material and through holes disposed in said silicide-based material;
   a base at which said airfoil is received;
   a reaction barrier coating disposed at an interface between said base and said airfoil;
   a silicide-based coating disposed at an exposed surface of said airfoil; and
   a thermal barrier coating disposed at an exposed surface of said silicide-based coating.

9. The turbine blade of claim 8, wherein said silicide-based material of said airfoil is niobium-silicide, a niobium-based refractory intermetallic composite, a molybdenum-based-silicide, or a combination comprising at least one of the foregoing materials.

10. The turbine blade of claim 8, wherein said base comprises at least two members metallurgically joined.

11. The turbine blade of claim 10, wherein said base is a superalloy of nickel, cobalt, or iron or a combination comprising at least one of the foregoing superalloys.

12. The turbine blade of claim 8, wherein said airfoil is maintained in said base in an interference fit.

13. The turbine blade of claim 8, wherein said reaction barrier coating is alumina, yttria-stabilized zirconia, mullite, MCrAlY, (NiPt)Al, NiAl, ruthenium, tungsten, rhenium, alloys comprising ruthenium, tungsten, or rhenium, or a combination comprising at least one of the foregoing materials.

14. The turbine blade of claim 8, wherein said airfoil comprises a wall having slots disposed therein, said slots defining cooling plenums in said wall.

15. The turbine blade of claim 8, wherein said silicide-based coating comprises a chromium-niobium-silicide compound.

16. The turbine blade of claim 8, wherein said silicide-based coating comprises niobium silicide.

17. A turbine blade, comprising:
   an airfoil comprising a silicide-based material and through holes disposed in said silicide-based material;
   a base at which said airfoil is received;
   a reaction barrier coating disposed at an interface between said base and said airfoil;
   a Laves phase-containing layer disposed at surfaces of said airfoil, said through holes, and said base; and
   a thermal barrier coating disposed at an exposed surface of said Laves phase-containing layer.

18. The turbine blade of claim 17, wherein said Laves phase-containing layer is of the form (Nb, Ti)(Cr, Si, Al)$_2$ and is about 30 to about 37 atomic percent niobium or a combination comprising at least one of niobium and titanium and about 63 to about 70 atomic percent chromium, silicon, aluminum, or any combination comprising at least one of chromium, silicon, and aluminum.

19. A turbine blade, comprising:
   an airfoil comprising a silicide-based material and through holes disposed in said silicide-based material;
   a base at which said airfoil is received;
   a diffusion barrier layer disposed at a surface of said airfoil;
   a platinum group metal layer disposed at said diffusion barrier layer; and
   a thermal barrier coating disposed at said platinum group metal layer.

20. The turbine blade of claim 19, wherein said diffusion barrier layer comprises,
   a Laves phase-containing layer,
   a chromium layer, and
   a ruthenium layer.

21. The turbine blade of claim 20, wherein said Laves phase-containing layer is of the form (Nb, Ti)(Cr, Si, Al)$_2$ and is about 30 to about 37 atomic percent niobium or a combination comprising at least one of niobium and titanium and about 63 to about 70 atomic percent chromium, silicon, aluminum, or any combination comprising at least one of chromium, silicon, and aluminum.

22. The turbine blade of claim 19, wherein said platinum group metal layer is platinum, palladium, rhodium, or a combination comprising at least one of the foregoing metals.

* * * * *